United States Patent [19]
Schmars

[11] Patent Number: 4,787,058
[45] Date of Patent: Nov. 22, 1988

[54] SYNTHETIC QUADRATURE GENERATING APPARATUS

[75] Inventor: William T. Schmars, Fullerton, Calif.

[73] Assignee: Rockwell International Corporation, El Segundo, Calif.

[21] Appl. No.: 776,181

[22] Filed: Sep. 13, 1985

[51] Int. Cl.[4] .......................................... G06F 15/51
[52] U.S. Cl. ............................ 364/807; 364/724.01; 364/825
[58] Field of Search ............... 364/825, 807; 331/1 A, 331/23, 14, 25; 455/113, 46, 60; 375/120, 20

[56] References Cited

U.S. PATENT DOCUMENTS

| | | | |
|---|---|---|---|
| 3,553,447 | 1/1971 | Zimmerman | 364/807 |
| 4,100,376 | 7/1978 | Woythaler | 455/46 |
| 4,206,425 | 6/1980 | Nossen | 331/1 A |
| 4,464,638 | 8/1984 | Crowley | 331/1 A |
| 4,589,083 | 5/1986 | Le Dinh | 364/825 |

Primary Examiner—Michael R. Fleming
Attorney, Agent, or Firm—H. Fredrick Hamann; G. A. Montanye; James F. Kirk

[57] ABSTRACT

A synthetic quadrature generating apparatus responsive to an input reference signal of the form SIN(wt) from an input reference signal source and to an error shifted quadrature signal of the form COS(wt+L) for forming a quadrature output signal of the form COS(wt)*COS(L) substantially free of error shift. The apparatus comprises an error signal synthesizing filter means responsive to the input reference signal and to the error shifted quadrature signal for forming a filtered signal of the form SIN(L); a correction means responsive to the input reference signal and to the filtered signal for forming their product as a filtered product signal; and a means responsive to the filtered product signal and the error shifted quadrature signal for forming their sum as an output quadrature signal of the form COS(wt)*COS(L).

9 Claims, 3 Drawing Sheets

SYNTHETIC QUADRATURE GENERATING APPARATUS

CROSS REFERENCES

1. APPARATUS FOR INCREASING RESOLUTION OF A LASER GYROSCOPE, by A. K. Dorsman, U.S. Ser. No. 06/457,845, Filed 1/14/83, and assigned to the same assignee. This application is subject to a Department of Commerce Secrecy Order.
2. APPARATUS FOR INCREASING RESOLUTION OF LASER GYROSCOPE WITH CLOCK SYNCHRONIZATION, by A. K. Dorsman, U.S. Ser. No. (unknown), Filed 8/20/85, and assigned to the same assignee.

BACKGROUND OF THE INVENTION

1. Field of the Invention

This invention relates to improvements in laser gyroscopes, and more particularly to circuits for increasing the resolution of a laser gyroscope.

2. Description of the Prior Art

Laser gyroscopes are known in the art to have counter-rotating light beams in a cavity, the counter-rotating beams being sensed through partially transmissive mirrors by combining optics to produce spaced-apart elongated patterns of light on an array of spaced-apart elongated photo detectors. The elongated patterns of light are referred to as fringe patterns. The fringe patterns remain stationary on the photo detector array while the frequencies of the counter rotating light beams are identical. Rotation of the gyroscope body on its sensitive axis normal to the plane of the light beams results in counter-propagating light beams of different frequencies. The fringe patterns translate across the photo detector array with increasing frequency in response to an increasing input body rate and they translate with decreasing frequency in response to a decreasing input body rate. A clockwise input body rate produces apparent fringe pattern motion in a first direction and a counterclockwise input body rate produces apparent fringe pattern motion across the photo diode detector array in an opposite direction.

The laser gyroscope readout is performed by biasing the photo diode detectors to produce an electrical signal having an amplitude proportional to the incident light intensity. The signal from each diode varies sinusoidally in response to movement of the fringe patterns across the photo diode detector array. The photo diode detectors are spaced and positioned to provide at least two quadrature signals (i.e. sinusoidal signals separated in phase by essentially ninety degrees) in response to movement of the fringe patterns across the photo diode detector array.

The quadrature signals obtained from the photo diode detector array are amplified and squared to provide a pair of digital quadrature signals having a first and second logic state. Electronic quadrature decoders sense the digital quadrature signals and provide a digital mode signal indicating the direction of gyro rotation, and count signals indicating the frequency of gyro rotation to a system of counters for integration to provide a continuous readout of the gyroscope body rotational angle.

Electronic quadrature decoder circuits can increase the resolution of a laser gyroscope by a factor of two or four through simple decoding at half-cycle (zero crossings) of each amplified sinusoidal signal from the photo detector array. To increase the resolution requires a scheme of either frequency or phase multiplication of the amplified quadrature signals; thereby, increasing the frequency for phase resolution. However, multiplying techniques are limited in resolution to the basic phase errors inherent in the amplified quadrature signals. One source of phase error is that error due to tolerance buildup associated with assembly of the combining optics and photo detector array. This phase error contributes to an increase in the spatial fringe pattern quadrature angle error. The reduction of this quadrature error to limits below that inherent to the gyro allows the use of increased phase resolution circuits in the readout decoder. Prior art laser gyroscopes have limited this error by tightening the mechanical and assembly tolerances to acceptable limits. Tighter mechanical and assembly tolerances contribute to higher instrument cost, and serves to limit the resolution achievable.

SUMMARY OF THE INVENTION

It is the object of this invention to provide a synthetic quadrature generator apparatus responsive to a first input reference signal of the form SIN(wt) such as from the combining optics and detector array of a ring laser gyro and to an error-shifted quadrature signal of the form COS (wt+L) for forming a quadrature output signal essentially equivalent to and of the form COS (wt). A first alternative embodiment of the invention apparatus (10) uses analog circuitry to implement the functions required to form a signal essentially equivalent to the desired COS (wt) output.

DESCRIPTION OF THE PREFERRED EMBODIMENT

Figure 1:
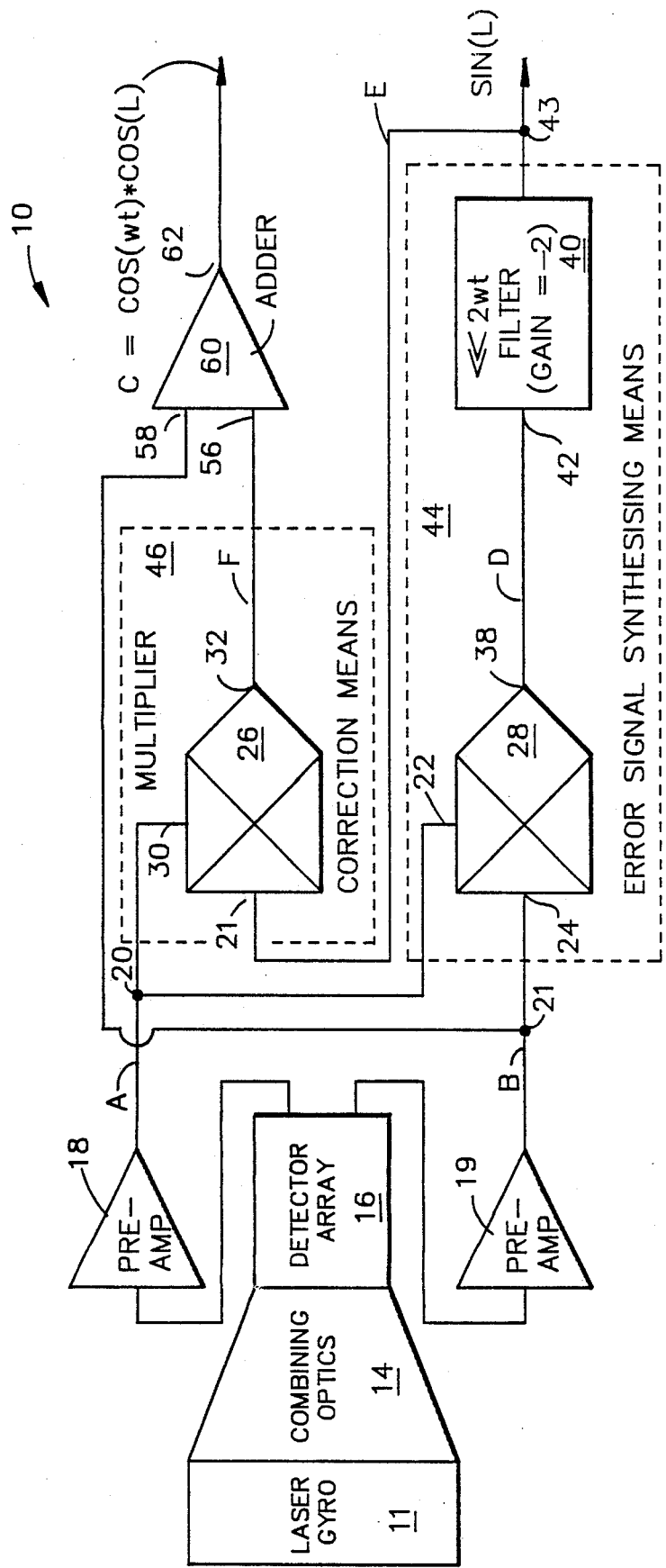
FIG. 1 is a functional block diagram of a synthetic quadrature generating apparatus using analog functional blocks.

Referring to FIG. 1, the invention synthetic quadrature generating apparatus 10 is responsive to an input reference signal "A". Signal A is of the form:

$$A = SIN(wt) \quad \quad 1.$$

Signal A is received at terminal 20 from a reference signal source such as a first output from the combining optics of a ring laser gyro. This invention circuit of FIG. 1 also receives signal "B: at terminal 21. Signal B is of the form:

$$B = COS(wt + L) \quad \quad 2.$$

Signal B is an error shifted quadrature signal. Signal L represents the phase shift error of signal B away from the angle (wt). The output of the invention apparatus is signal "C" at terminal 62. Signal C is of the form:

$$C = COS(wt) * COS(L) \quad \quad 3.$$

Signal C is a quadrature output signal that is characterized as being substantially free of error shift such as signal L.

Signals A and B are typically quadrature signals generated by the combining optics 14 and detector array 16 in response to angular rotation of a laser gyro 11 about its sensitive axis. Angle (L) is the quadrature phase error between signals A and B. (w) represents the sinusoidal frequency in radians/sec of signals A and B. The frequency w is proportional to the angular body rate input to the gyro on its sensitive axis, i.e. the angular velocity that the gyro is rotating at around its sensitive axis.

The embodiment of FIG. 1 comprises an error signal SIN(L) synthesizing means such as the circuitry within phantom block 44. This synthesizing means 44 is coupled to receive input reference signal A at terminal 22 and the error shifted quadrature signal B at terminal 24 to form a filtered signal "E" at terminal 43.

The elements within phantom block 46 represent correction means responsive to the input reference signal A at terminal 30 and to the filtered signal E at terminal 21 for forming their product as a filtered product signal "F" at terminal 56.

Adder 60 represents an adder means responsive to the filtered product signal F and the error shifted quadrature signal B for forming their sum as the desired output quadrature signal C at terminal 62.

The design for the invention circuit of FIG. 1 is explained by using the conventional expansion formula for the COSINE of the sum of two angles to expand equation 2. above. By way of reference, the formula for expanding the COSINE of the sum of two angles is obtained from the CRC Standard Mathematical Tables, 16th Edition, pg. 184 as:

$$COS(a+b) = (COS\ a)*(COS\ b) - (SIN\ a)*(SIN\ b) \quad 4.$$

The values of signals wt is substituted for angle "a" and error angle L is substituted for angle "b" to obtain equation 5. below.

$$COS(wt+L) = (COS\ wt)*(COS\ L) - (SIN\ wt)*(SIN\ L) \quad 5.$$

The output signal required of the invention circuit is observed to be imbedded within equation 5. Equation 5 is solved for the invention circuit in equation 6 as:

$$COS\ wt = (1/COS\ L)*[(COS(wt+L)) + (SIN\ wt)*(SIN\ L)] \quad 6.$$

Equations 1 and 2 above define input signal A = SIN wt and input signal B = COS(wt+L). Substituting signals A and B into equation 6 obtains equation 7 below.

$$COS\ wt = (1/COS\ L)*[(B) + (A)*(SIN\ L)] \quad 7.$$

For small values of angle L, COS L varies only slightly from the value of 1.0. The expression (A)*(SIN L) requires the implementation of the expression for (SIN L) before mechanization of equation 7 is possible for signal C.

It is observed that by taking the product of signals A and B, the following relationship is obtained.

$$[SIN(wt)*COS(wt+L)] = (\tfrac{1}{2})[(SIN(2wt+L)) + SIN(-L)] \quad 8.$$

The second harmonic term SIN(2wt+L) in equation 8. is removed from the product relationship by filtering. The expression that is left is the expression $(\tfrac{1}{2})[SIN(-L)]$. A trigonometric identity supplies the relationship of equation 9. below:

$$SIN(-L) = -SIN(L) \quad 9.$$

Equations 8 and 9 show that the expression for SIN(−L) is obtained by multiplying signals A and B together, by removing essentially all components of SIN(2wt) from the product of A and B, and then by multiplying the result by (−2).

Referring to FIG. 1, elements within phantom block 44 characterize an embodiment of an error signal synthesizing means. Terminal 22 is responsive to or coupled to the input reference signal A. Terminal 24 is responsive to or coupled to signal B, the error shifted quadrature signal. The output of the error signal synthesizing means 44 is made available at terminal 43 as a filtered signal E representing SIN(L).

The error signal synthesizing means 44 is shown comprising a first multiplier 28 for multiplying the input reference signal A by the error shifted quadrature signal B to form an error signal D at multiplier output terminal 38.

Gain filter 40 receives error signal D at input terminal 42. Filter 40 responds to signal D by attenuating signal components having a frequency of 2wt and multiplies the error signal D by a factor of −2 to form the filtered signal E where E = SIN(L).

Phantom block 46 represents a correction means responsive to the input reference signal A at 30 and to the filtered signal E at 21 for forming their product as a filtered product signal F at 32.

Signal F represents the second term in equation 7. above. The right side of Equation 7. provides the expressions and relationships necessary for obtaining the required signal C when multiplied by COS(L).

The correction means 46 contains multiplier 26. This multiplier has a first input terminal 30 coupled to the input reference signal source to receive signal A from 20 and a second input 21 coupled to the filtered signal E at 43. The means for multiplying, i.e. multiplier 26 has an output terminal 32 for sourcing the filtered product signal F.

Adder 60 represents a means responsive to the filtered product signal F at 56 and the error shifted quadrature signal B at 58 for forming their sum as an output quadrature signal C at 62. Adder 60 has a first input terminal 56 coupled to receive the filtered product signal F from 32 and a second input terminal 58 coupled to receive the shifted quadrature signal B from 21.

The summing means is characterized to add the filtered product signal F and the shifted quadrature signal B and to provide a synthetic quadrature signal C at output terminal 62.

Signal C is obtained from equation 7. by multiplying both sides by COS(L) to obtain:

$$C = COS(wt)*COS(L) = [B + A*SIN(L)] \quad 10.$$

Signal C is the synthetic signal required, i.e. it is a very close approximation of COS(wt) except for the COS(L) multiplier. For reasonable quadrature error, i.e. plus or minus 20 degrees, the COS(L) term produces less than 7% amplitude change in the output at terminal 62.

Referring to equation 7. above, the correction signals for signal C is proper for both directions of angular inputs, i.e., if w is replaced by a −w the same result is obtained.

$$A = \text{SIN}(-wt) = -\text{SIN}(wt) \quad 11.$$
$$B = \text{COS}(-wt + L) = \text{COS}(wt - L) \quad 12.$$
$$B = [\text{COS}(wt) * \text{COS}(-L)] - [\text{SIN}(wt) * \text{SIN}(-L)] \quad 13.$$
$$= [\text{COS}(wt) * \text{COS}(L)] + [\text{SIN}(wt) * \text{SIN}(L)]$$
$$C = \text{COS}(wt) = [1/\text{COS}(L)] * [(B) + (A) * (\text{SIN}(L)] \quad 14.$$

the above expression for signals A and C is correct for opposite sign rotation, and furthermore the expression is correct for all values of w including dc (or a stationary input).

CIRCUIT OPERATION

Figure 2:
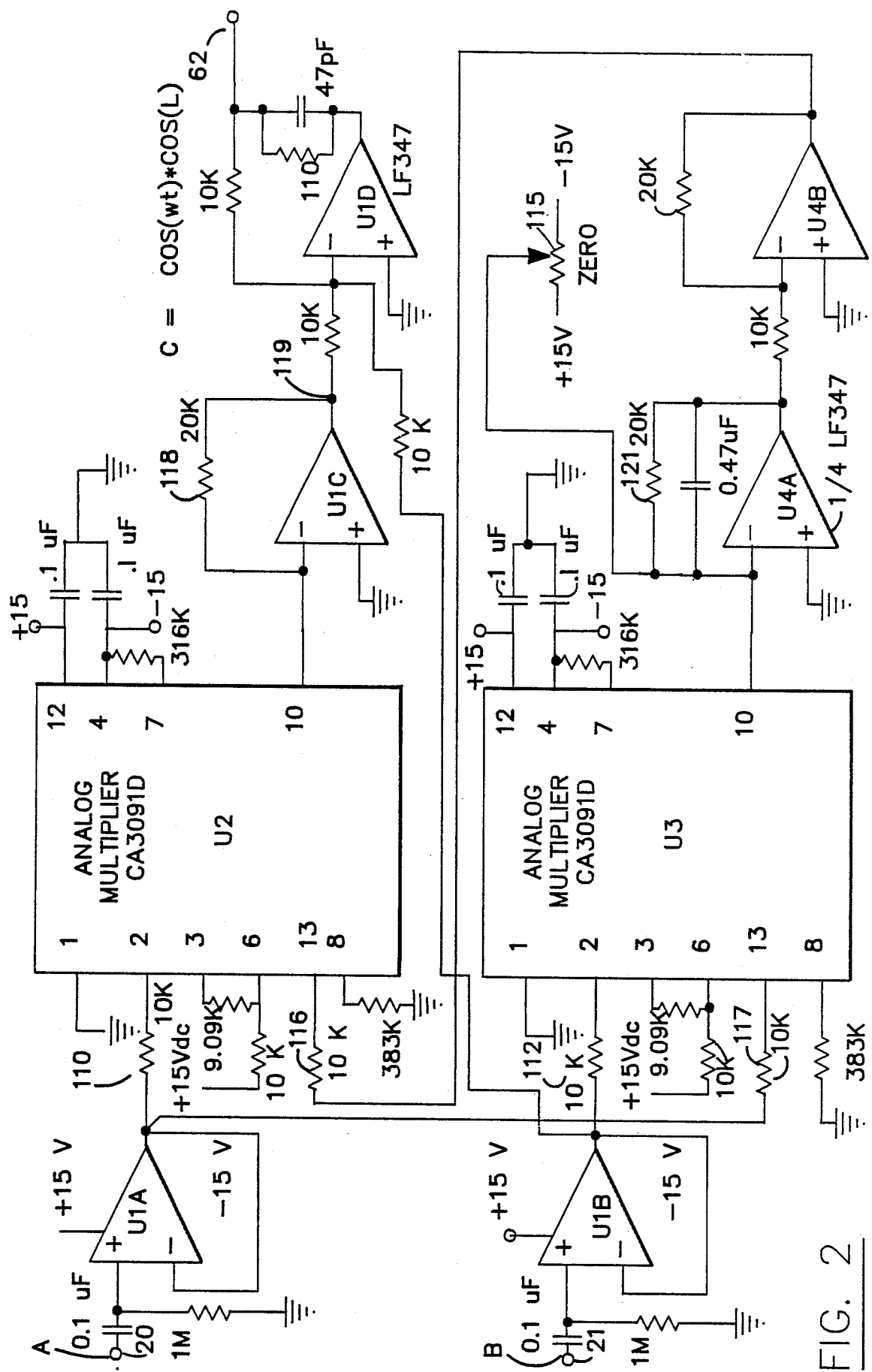
FIG. 2 is a schematic of a circuit for implementing the analog functions characterized by FIG. 1.

FIG. 2 is a schematic of an analog mechanization of an alternative embodiment of the invention of Synthetic Quadrature Generator. U1A, B. C. and D are typically amplifiers in a quad-amplifier integrated circuit such as the LF347 by the National Semiconductor Corp. of Santa Clara, Calif. U4A and U4B use a second LF347 device. U2 and U3 use linear multiplier integrated circuits such as the CA3091D by the RCA Corp. of Somerville, N.J.

The U2 multiplier performs the A*SIN(L) multiplication performed by multiplier 26 in FIG. 1. Input resistor 110 receives signal A at its left terminal, its right terminal being coupled to U2-2. The U2 amplifier operates to make pin 2 appear as a virtual ground, i.e., the integrated circuit holds the voltage at pin 2 at essentially zero volts irrespective of what voltage is applied to the left terminal of resistor 110 by the output of U1A. Resistor 116 couples signal E=SIN(L) to the second input into U3-13. Pin U2-13 also operates as a virtual ground.

The output of U2 is present at pin U2-10 as a current, the current having a magnitude equivalent to the product of the currents entering U2-2 and U2-13. The output terminal 119 of U1C applies a voltage of opposite phase to the right side of feedback resistor 118 to force the inverting input of U1C to appear to be a virtual ground to current leaving or entering U2-10.

An input of 1.0 volt to resistors 110 and 116 produces input currents of 100 micro-amps into pins U2-2 and U2-13. This results in an output current of 50 micro-amps from U2-10. The gain of the multiplier is one-half. The output of U1C drops to −1 V. to allow all current leaving U2-10 to enter the 20K resistor 118. The gain resulting from resistor 118 is therefore −1.

Resistor 112 couples signal B to a virtual ground at U3-2. Resistor 117 couples signal A to a virtual ground at U3-13. An output current proportioned to the product of signals A and B is provided at U3-10. It is then passed through resistor 121 for a gain of −1 by operation of U4A. U4B provides another gain of −2 to obtain signal E=SIN(L).

U1C is a transconductance amplifier that converts the output current to a voltage source. Multiplier U3, having a gain of one-half, performs the multiplication of SIN wt*COS(wt+L).

U1D is a summing amplifier or NEGATIVE ADDER that performs the function of [A*SIN(L)+B]. Potentiometer 115 provides a phase zeroing adjustment at the filter input circuit to eliminate any dc error in the U3 multiplier from creating an incorrect SIN(L) term.

U4A and U4B operate as a low-pass filter and provide the necessary gain (−2) to generate SIN(L). The filter of block 40 in FIG. 1 is implemented by U4A, resistor 121 and the 0.47 uF capacitor in parallel with resistor 121. The break frequency of this single pole low pass filter is less than 20 Hz, so as to guarantee a break frequency substantially below 2 wt. The resulting SIN(L) term varies very slowly and, in practice, is a very slowly varying term in relation to wt.

For fringe pattern signals that are not scaled properly, the input stage buffer amps (U1A or U1B) or the 10 kilohm volt-current converters resistors 110, 112 can be scaled for proper amplitude operation.

The above circuit was tested with a 4× frequency multiplying circuit and a 4× quadrature decoder. Test results are as follows. Quadrature correction can be performed for up to +70° error (+L), for the 4× quadrature decoder and up to +50° error for the additional 4× frequency multiplier, without introducing significant error sources into the decoding electronics.

Figure 3:
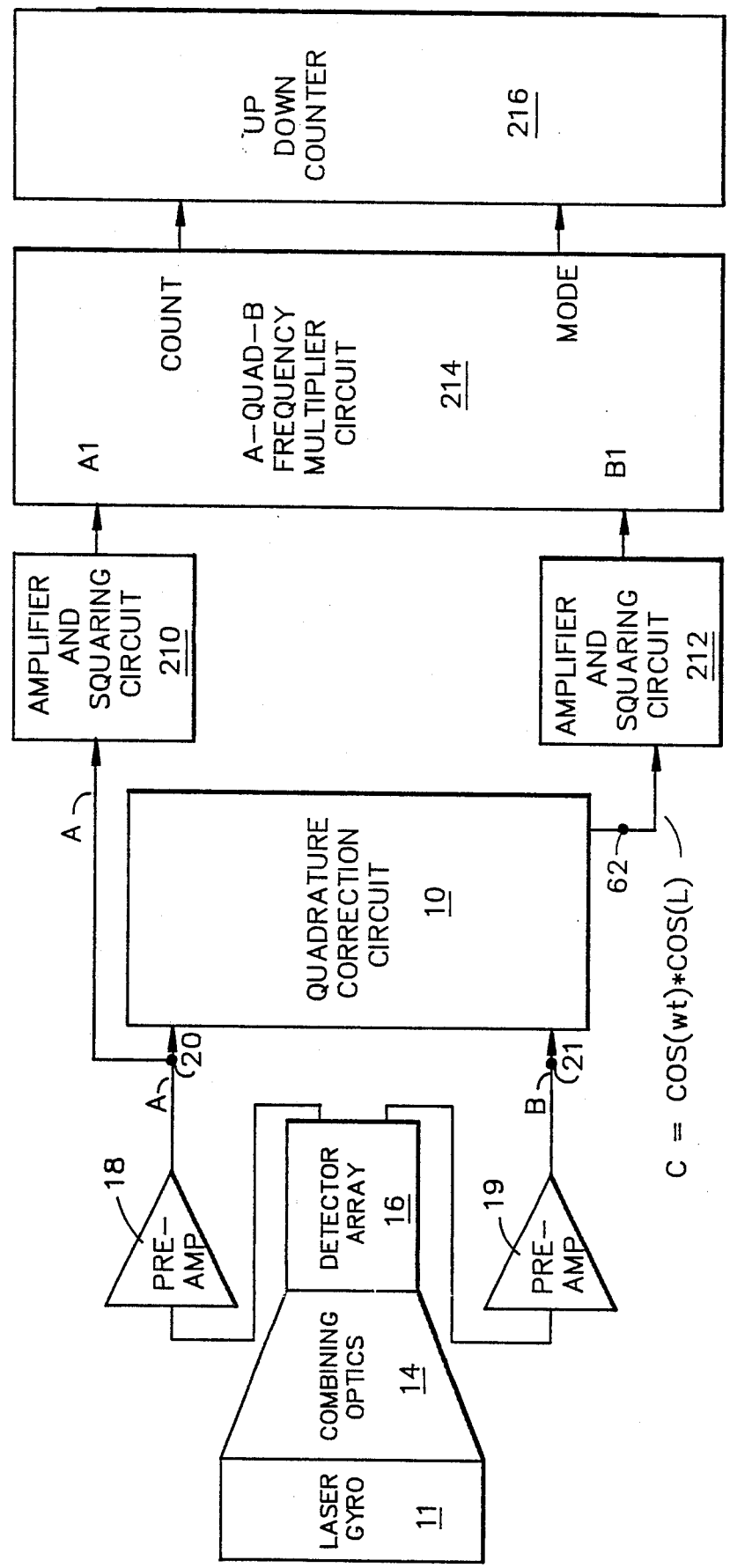
FIG. 3 shows a representative ring laser gyro angle data readout system employing the invention quadrature correction circuit 10.

FIG. 3 shows a representative ring laser gyro angle data readout system employing the invention quadrature correction circuit 10.

AMPLIFIER and SQUARING CIRCUITS 210 and 212 receive sinusoidal signals A and C from the QUADRATURE CORRECTION CIRCUIT 10 and amplify and clip the signals to form phase related logic signals A1 and B1. Signals A1 and A2 are phase related signals having a first and second logic state.

The A QUAD B FREQUENCY MULTIPLIER CIRCUIT 214 provides a MODE signal to UP-DOWN COUNTER 216 to direct the counter to count up or down in response to the COUNT signal. A detailed discussion of an A-QUAD-B FREQUENCY MULTIPLIER CIRCUIT such as that characterized by block 214 is described in APPARATUS FOR INCREASING RESOLUTION OF A LASER GYROSCOPE, by A. K. Dorsman, U.S. Ser. No. 06/457,845, Filed 1/14/83, and assigned to the same assignee.

What is claimed is:

1. A synthetic quadrature generating apparatus responsive to an input reference signal of the form SIN(wt) from an input reference signal source and to an error shifted quadrature signal of the form COS(wt+L) from a shifted quadrature signal source, wherein angle "L" represents a quadrature phase error angle between angle (wt) and angle (wt+L) for forming a synthetic quadrature output signal of the form COS(wt)*COSL substantially free of error shift angle L comprising:
   an error signal synthesizing filter means responsive to said input reference signal and to said error shifted quadrature signal for forming a filtered signal of the form SIN(L);
   correction means responsive to said input reference signal and to said filtered signal for forming their product as a filtered product signal of the form SIN(wt)*SIN(L);
   adder means responsive to said filtered product signal and said error shifted quadrature signal for forming their sum as a synthetic quadrature output signal of the form COS(wt)*COSL.

2. The synthetic quadrature generating apparatus of claim 1 wherein said error signal synthesizing filter means responsive to said input reference signal and to said error shifted quadrature signal for forming a filtered signal; further comprising:
   a first multiplier for multiplying said input reference signal by said error shifted quadrature signal for forming an error signal; and,
   a gain filter responsive to said error signal for attenuating signal components having a frequency of 2 wt and for multiplying said error signal by a factor of −2 to form said filtered signal.

3. The synthetic quadrature generating apparatus of claim 2 wherein said correction means responsive to said input reference signal and to said filtered signal for forming their product as a filtered product signal further comprises:

a means for multiplying having a first input terminal coupled to receive said input reference signal source and a second input terminal coupled to receive said filtered signal; said means for multiplying being characterized to form the product of said input reference signal and said filtered signal and having an output terminal for sourcing said filtered product signal.

4. The synthetic quadrature generating apparatus of claim 1 wherein said correction means responsive to said input reference signal and to said filtered signal for forming their product as a filtered product signal further comprises:

a second multiplier having a first input terminal coupled to said input reference signal source and a second input coupled to said filtered signal; said multiplier being characterized to form the product of said input reference signal and said filtered signal and having an output terminal for sourcing said filtered product signal.

5. The synthetic quadature generating apparatus of claim 1 wherein said adder means responsive to said filtered product signal and said error shifted quadrature signal for forming their sum as an ouptut quadrature signal further comprises:

a summing means having a first input terminal coupled to receive said filtered product signal and a second input terminal coupled to receive said error shifted quadrature signal, said summing means being characterized to add said filtered product signal and said error shifted quadrature signal and to provide said quadrature signal at an output terminal.

6. The synthetic quadrature generating apparatus of claim 1 wherein said error signal synthesizing means responsive to said input reference signal and to said error shifted quadrature signal for forming a filtered signal; further comprises:

an analog first multiplier for multiplying said input reference signal by said error shifted quadrature signal for forming an analog error signal; and, an analog gain filter responsive to said analog error signal for attenuating signal components having frequency components, including and above the frequency of 2 wt and for multiplying said analog error signal by a factor of −2 to form said filtered signal.

7. The synthetic quadrature generating apparatus of claim 1 wherein said adder means responsive to said filtered product signal and said error shifted quadrature signal for forming their sum as an output quadrature signal further comprises a summing amplifier having a first input coupled to receive said filtered product signal and a second input coupled to receive said error shifted quadrature signal and an output terminal for sourcing said synthetic quadrature output signal of the form COS(wt)*COSL.

8. A synthetic quadrature generating apparatus responsive to an analog input reference signal of the form SIN(wt) from an input reference signal source and to an error shifted quadrature signal of the form COS(wt+L) from an error shifted quadrature signal source, wherein angle "L" represents a quadrature phase error angle between angle (wt) and angle (wt+L), for forming a synthetic analog quadrature output signal of the form COS(wt)*COS(L) substantially free of error shift angle (L) comprising:

an analog error signal synthesizing means responsive to said input reference signal and to said error shifted quadrature singal for forming a filtered signal of the form SIN(L);

an analog correction means responsive to said input reference signal and to said filtered signal for forming their product as a filtered product signal of the form SIN(wt)*SIN(L);

analog adder means responsive to said filtered product signal and said error shifted quadrature signal for forming their sum as said synthetic quadrature output signal of the form COS(wt)*COS(L).

9. A synthetic quadrature generating apparatus responsive to an analog input reference signal of the form SIN(wt) from an analog input reference signal source and to an error shifted quadrature signal for forming a quadrature output signal of the form COS(wt) substantially free of error shift comprising:

a first multiplier for multiplying said input reference signal by said error shifted quadrature signal for forming an error signal; and, a gain filter responsive to said error signal for attenuating signal components having a frequency of 2 wt and for multiplying said error signal by a factor of −2 to form said filtered signal;

a means for multiplying having a first input terminal coupled to said input reference signal source and a second input coupled to said filtered signal; said means for mulitplying having an output terminal for sourcing said filtered product signal; and, a summing means having a first input terminal coupled to receive said filtered product signal and a second input terminal coupled to receive said shifted quadrature signal, said summing means being characterized to add said filtered product signal and said shifted quadrature signal and to provide said quadrature signal at an output terminal;

means responsive to said filtered product signal and said error shifted quadrature signal for forming their sum as an output quadrature signal.

* * * * *